(12) United States Patent
Cunningham et al.

(10) Patent No.: US 12,469,837 B2
(45) Date of Patent: Nov. 11, 2025

(54) PATTERNED ELECTRODES

(71) Applicant: FORD GLOBAL TECHNOLOGIES, LLC, Dearborn, MI (US)

(72) Inventors: Celia Cunningham, Northville, MI (US); Andrew Robert Drews, Ann Arbor, MI (US); Ali Rashti, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 26 days.

(21) Appl. No.: 18/640,565

(22) Filed: Apr. 19, 2024

(65) Prior Publication Data

US 2025/0329704 A1 Oct. 23, 2025

(51) Int. Cl.
*H01M 4/04* (2006.01)
*B41M 5/00* (2006.01)
*H01M 4/139* (2010.01)

(52) U.S. Cl.
CPC ........ *H01M 4/0404* (2013.01); *B41M 5/0047* (2013.01); *H01M 4/139* (2013.01)

(58) Field of Classification Search
None
See application file for complete search history.

(56) References Cited

U.S. PATENT DOCUMENTS

| | | | |
|---|---|---|---|
| 10,164,253 B2 | 12/2018 | Kim et al. | |
| 11,986,993 B2 * | 5/2024 | Sodano | B33Y 10/00 |
| 2017/0373284 A1 * | 12/2017 | Durstock | H01M 4/525 |
| 2019/0341604 A1 * | 11/2019 | Turi | H01M 4/14 |
| 2021/0151765 A1 * | 5/2021 | Ellison | H01M 4/386 |

FOREIGN PATENT DOCUMENTS

| | | | |
|---|---|---|---|
| DE | 102020126758 | * 10/2020 | |
| DE | 102020126758 A1 * | 5/2021 | H01M 4/13 |

* cited by examiner

*Primary Examiner* — Austin Murata
(74) *Attorney, Agent, or Firm* — David B. Kelley; Brooks Kushman P.C.

(57) ABSTRACT

In one aspect of the disclosure, a method is presented. The method involves coating a conductive substrate with an electrode slurry of solvent, active material, binder, and additives to form a wet electrode. The wet electrode is injected with a column of miscible non-solvent fluid into a surface of the wet electrode to displace the electrode slurry around the column and initiate non-solvent-induced phase inversion of the binder in contact with the miscible non-solvent fluid such that the binder in contact with the miscible non-solvent fluid solidifies around the column into a solid-free channel at the surface of and into the wet electrode.

20 Claims, 3 Drawing Sheets

PATTERNED ELECTRODES

TECHNICAL FIELD

The disclosure relates to electrode materials for lithium-ion batteries.

BACKGROUND

Lithium-ion batteries, integral to various technological applications, feature porous electrodes permeated by a liquid electrolyte. This design facilitates the movement of lithium ions through electrolyte-filled channels toward the active material within the electrode. However, the efficiency of this ion transport is influenced by the electrode's tortuosity, which characterizes the path length of ion travel relative to the direct distance between two points. A tortuosity greater than 1 indicates a non-linear path that increases the distance ions must travel, altering transport properties like diffusivity and conductivity.

Elevated tortuosity can lead to compositional gradients within the electrode, affecting the electrode's potential and potentially leading to lithium plating on the negative electrode. Lithium plating reduces battery capacity and can contribute to the formation of lithium dendrites. Additionally, tortuosity imposes design limitations on lithium-ion batteries by limiting the practical thickness of electrodes. Thicker electrodes exacerbate transport limitations, hindering the battery's performance.

SUMMARY

In one aspect of the disclosure, a method is presented. The method involves coating a conductive substrate with an electrode slurry of solvent, active material, binder, and additives to form a wet electrode. The wet electrode is injected with a column of miscible non-solvent fluid to displace the electrode slurry mixture around the column and initiate non-solvent-induced phase inversion of the binder in contact with the miscible non-solvent fluid such that the binder in contact with the miscible non-solvent fluid solidifies around the column into a solid-free channel at a surface of and into the wet electrode.

The column may be injected into the surface of the wet electrode by ink-jet deposition. The active material may be lithium-based. The solvent may be N-methyl-2-pyrrolidone. The binder material may be polyvinylidene fluoride. The miscible non-solvent fluid may be water-based. The active material may be graphite-based. The solvent may be water-based. The binder may be carboxymethyl cellulose. The miscible non-solvent fluid may be acetone-based.

In another aspect of the disclosure, a method of forming a solid-state battery cell is presented. The method involves injecting a slurry of solid electrolyte and non-solvent into a wet electrode coating including active material and binder to displace the wet electrode coating around the slurry and initiate non-solvent-induced phase inversion of the binder in contact with the slurry such that the binder in contact with the slurry solidifies around the slurry into a pit in the wet electrode. The slurry may be injected into the wet electrode coating by ink-jet deposition.

In yet another aspect of the disclosure, a method is presented. The method includes mixing an active material, solvent, and polymer binder to form an electrode slurry mixture, coating the electrode slurry mixture onto a current collector to form a wet electrode, and injecting a column of miscible non-solvent fluid into the wet electrode to form a channel at a surface of and into the wet electrode after evaporation of the miscible non-solvent fluid and solvent.

The column may be injected into a surface of the wet electrode by ink-jet deposition. The active material may be lithium-based. The solvent may be N-methyl-2-pyrrolidone and the binder may be polyvinylidene fluoride. The non-solvent may be water-based. The active material may be graphite-based. The solvent may be water-based, and the binder may be carboxymethyl cellulose. The non-solvent may be acetone-based.

DETAILED DESCRIPTION

Figure 1A:
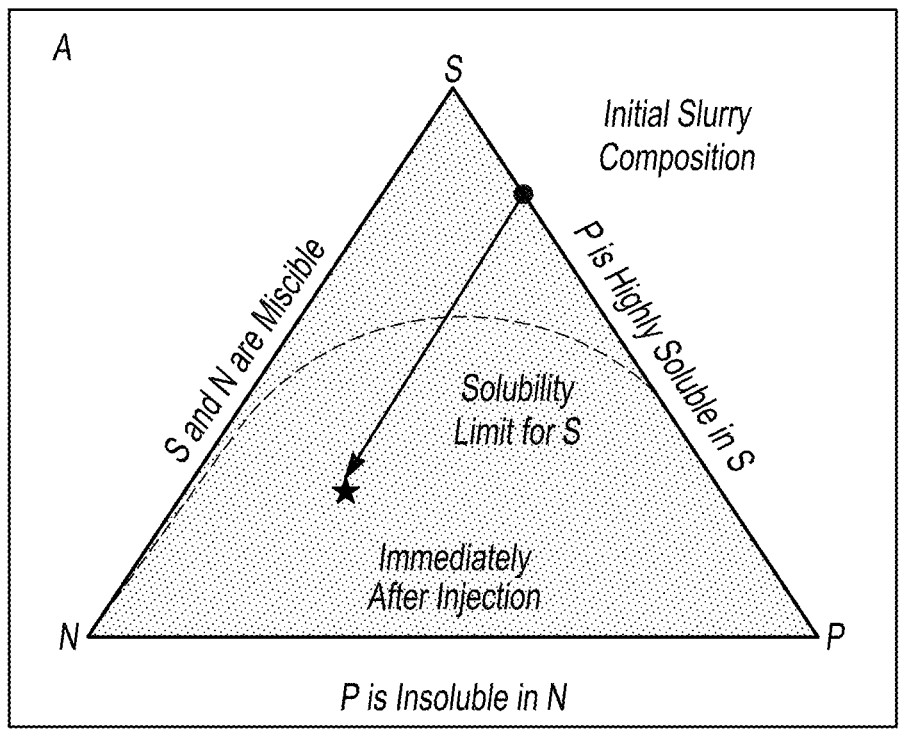
FIGS. 1A and 1B are ternary phase diagrams of slurry, binder, and non-solvent according to one or more aspects of the disclosure.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "electrode" means a conductor through which electricity enters or leaves an object, substance, or region within the context of a lithium-ion battery or similar energy storage device. In the operation of such batteries, electrodes facilitate the movement of electrons, contributing to the battery's charge and discharge cycles. The term "solvent" refers to a substance, which may be a liquid, that can dissolve other substances. The term "non-solvent fluid" refers to a liquid that does not dissolve a particular substance but is used within the specific process described to induce phase changes in the material. The term "slurry" denotes a semi-liquid mixture, generally composed of fine particles of a solid material suspended in a liquid. The term "phase inversion" signifies a process by which a material transitions from a liquid phase to a solid phase.

The disclosure relates to methods for forming low-tortuosity channels within a thickness of an electrode, by injection of a non-solvent fluid into a wet electrode slurry coating. This approach displaces solids, extending from a surface of the electrode into the electrode. The subsequent evaporation of the non-solvent, alongside the slurry solvent during the drying process, leaves behind empty channels. Non-solvent phase inversion is adapted to enhance lithium-ion battery performance by facilitating more direct ion transport pathways.

In one aspect, a solvent is mixed with an active material, binder, and additional additives to form a mixture. This mixture is then coated onto a current collector, creating a wet electrode. A miscible non-solvent fluid is injected into this wet electrode. This non-solvent, which does not dissolve the binder but is miscible with the slurry solvent, prompts a rapid phase inversion. This inversion solidifies the binder around the injection site, carving out a channel within the electrode. As drying proceeds, this channel becomes void of solids, and may be filled with electrolyte in final packaging into an electrode assembly. The channel provides a path for lithium-ion movement, reducing overpotentials, and mitigating the chance of lithium plating.

N-methyl-2-pyrrolidone can serve as the slurry solvent, with water acting as the non-solvent in a cathode slurry context. This combination is chosen for its compatibility with cathode materials such as polyvinylidene fluoride binders and lithium nickel manganese cobalt oxide active materials. Conversely, for an anode slurry, water might be used as the solvent, with acetone as the non-solvent, suitable for anode materials such as carboxymethyl cellulose binders and graphite active materials due to acetone's complete miscibility with water and carboxymethyl cellulose's insolubility in acetone. Ink-jet deposition may be used for non-solvent injection, which may allow for precision in creating the desired channel patterns within the electrode.

Another aspect involves the injection of a solid electrolyte slurry into the electrode coating. In this variation, the solid electrolyte slurry's solvent acts as the non-solvent to the binder in the electrode slurry. As drying occurs, the electrode channels are filled with the solid electrolyte material. This approach mirrors the effects seen with liquid electrolyte systems but offers additional flexibility in non-solvent choice, as the solid electrolyte may support the structural integrity of the channels during drying. By providing a more direct pathway for lithium-ion diffusion, the tortuosity of the channels is reduced within the electrode. This may increase charging speed and energy density.

Figure 1B:
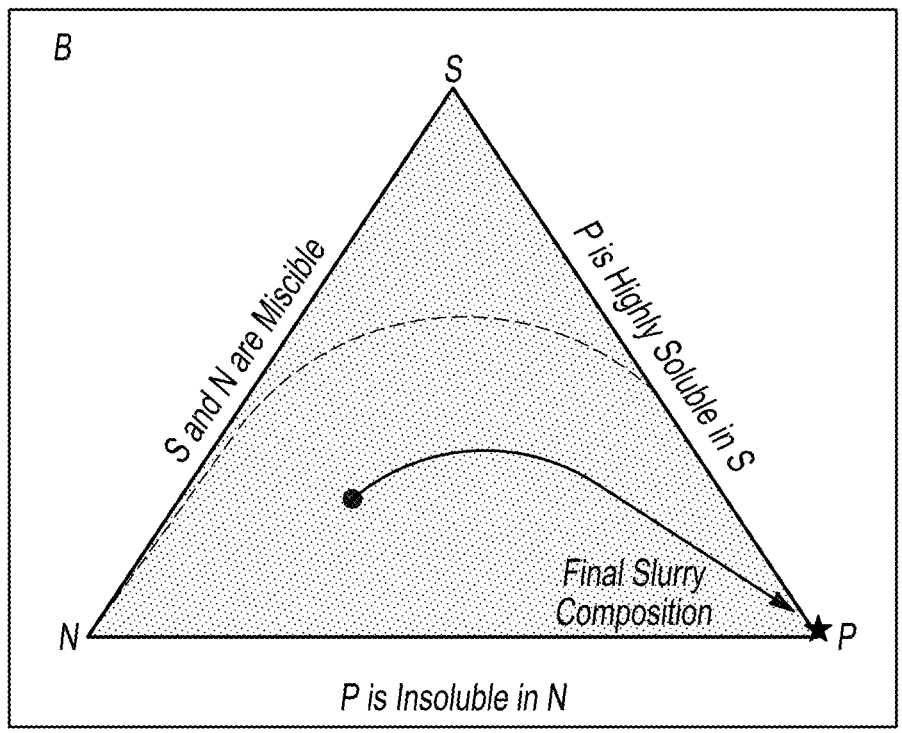

FIGS. 1A-B, show the relationship and phase transitions between the solvent(S), non-solvent (N), and polymer binder (P) during the process of forming low-tortuosity channels in an electrode slurry mixture. FIG. 1A shows an initial state immediately after injection of a non-solvent (N) into an electrode slurry composed of a solvent(S) and a polymer binder (P). The diagram shows a ternary phase system where solvent(S) and non-solvent (N) are fully miscible. In contrast, polymer binder (P) is shown to be insoluble in non-solvent (N). The initial slurry composition is marked by a solid black dot, indicating the starting mixture of solvent(S) and polymeric binder (P). The dashed red curve represents the solubility limit for the solvent(S) in the presence of the non-solvent (N), beyond which phase separation occurs. The star symbol marks the composition immediately after injection, showing the shift towards the non-solvent (N) vertex due to the introduction of the non-solvent (N), placing the system at or beyond the solubility limit, which leads to the solidification of the binder around the injection site.

FIG. 1B shows the phase change of a slurry mixture as it dries, forming a final electrode structure with columnar holes. The starting point for this process may be the final composition from FIG. 1A, following the injection of the non-solvent (N). The curved black arrow shows the trajectory of the drying process, which involves the evaporation of both the solvent and non-solvent (N). This leads to a reduction in the relative amount of non-solvent (N) and solvent(S), and an increase in the proportion of polymer binder (P), as indicated by the movement towards the polymer binder (P) vertex. The final slurry composition is marked by a star, situated on the base of the diagram, which demonstrates a higher proportion of polymer binder (P) and a decrease in non-solvent (N) and solvent(S), resulting in the solidification of the polymer binder (P) and the formation of empty channels within the electrode as the fluids evaporate.

Figure 2:
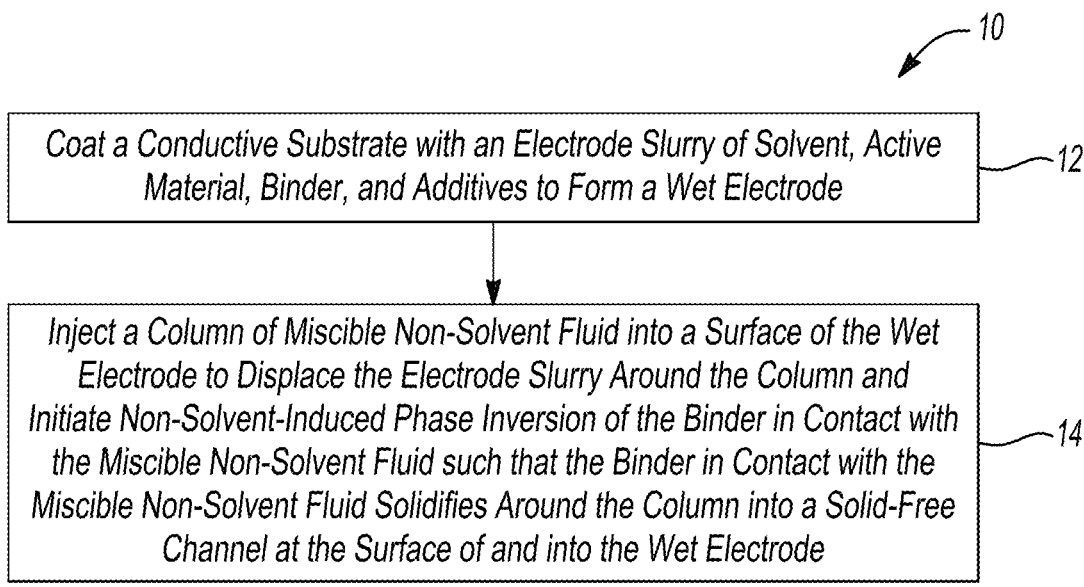
FIG. 2 is a flowchart of a method according to any one or more aspects of the disclosure.

FIG. 2 is a flowchart of method 10 according to any one or more aspects of the disclosure. In block 12 the method 10 begins with coating a conductive substrate with an electrode slurry of solvent, active material, binder, and additives to form a wet electrode. In block 14, the wet electrode is injected with a column of miscible non-solvent fluid into a surface of the wet electrode to displace the electrode slurry around the column and initiate non-solvent-induced phase inversion of the binder in contact with the miscible non-solvent fluid such that the binder in contact with the miscible non-solvent fluid solidifies around the column into a solid-free channel at the surface of and into the wet electrode. The solid-free channel has low-tortuosity for increased ionic conduction. For cathode configurations, lithium-based active material may be used, with N-methyl-2-pyrrolidone as the solvent for its ability to dissolve polyvinylidene fluoride binder, and water-based non-solvent. These components facilitate the phase inversion process to create a low-tortuosity channel. For anode configurations, a graphite-based active material may be used, with water as the solvent and carboxymethyl cellulose as the binder. The non-solvent for an anode configuration may be acetone-based, for its miscibility with water. These components similarly facilitate the phase inversion process to create a low-tortuosity channel.

Figure 3:
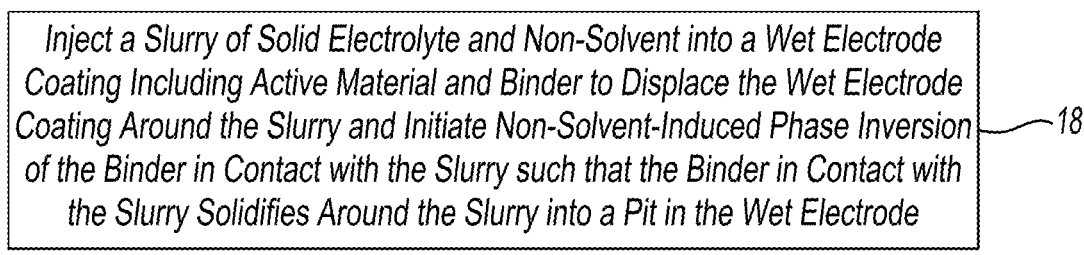
FIG. 3 is a flowchart of a method of forming a solid-state battery according to any one or more aspects of the disclosure.

FIG. 3 is a flowchart of a method 16 of forming a solid-state battery according to any one or more aspects of the disclosure. Block 18 includes injecting a slurry of solid electrolyte and non-solvent into a wet electrode coating including active material and binder to displace the wet electrode coating around the slurry and initiate non-solvent-induced phase inversion of the binder in contact with the slurry such that the binder in contact with the slurry solidifies around the slurry into a pit in the wet electrode. The pit defines a low-tortuosity pathway conducive to increased ionic conduction in solid-state batteries. The slurry may be injected into the wet electrode by ink-jet deposition. Ink-jet deposition allows for the creation of multiple pits in the wet electrode with precision, for a consistent and repeatable pattern. Other deposition techniques may also be used, providing manufacturing versatility in forming the low-tortuosity pit.

Figure 4:
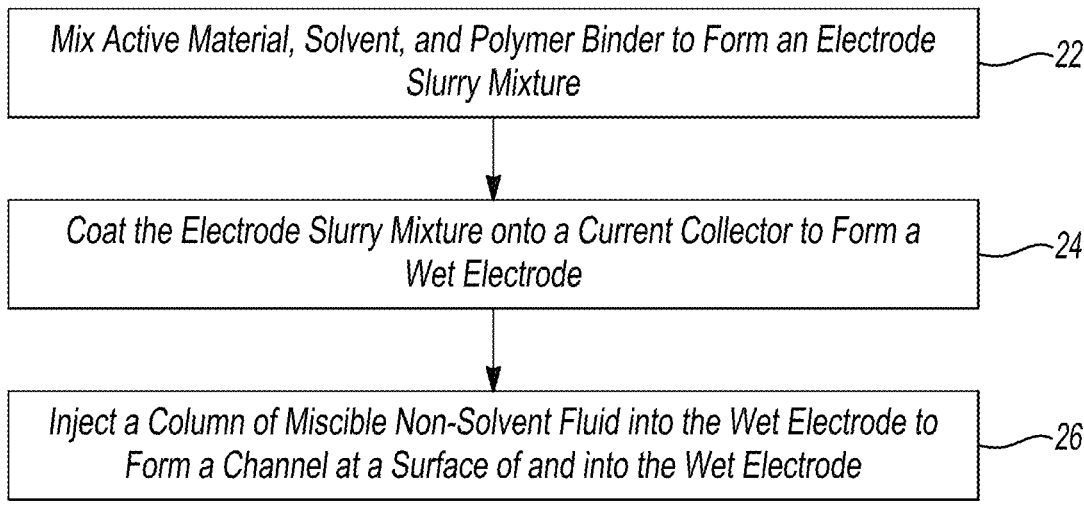
FIG. 4 is a flowchart of a method according to any one or more aspects of the disclosure.

FIG. 4 is a is a flowchart of method 20 according to any one or more aspects of the disclosure. In block 22, an active material is mixed with solvent and polymer binder to form an electrode slurry mixture. In block 24, the method 20 further involves coating the electrode slurry mixture onto a current collector to form a wet electrode. In block 26, a column of miscible non-solvent fluid is injected into the wet electrode to form a channel at a surface of and into the wet electrode after evaporation of the miscible non-solvent fluid and solvent. The column may be injected into the wet electrode by ink-jet deposition. For cathode configurations, the active material may be lithium-based. The solvent used for cathode configurations may be n-methyl-2-pyrrolidone due to its effectiveness in dissolving cathode binder, which may be polyvinylidene fluoride-based. Polyvinylidene fluoride or other suitable cathode binder materials may be chosen for their electrochemical stability and strong adherence to the active material. The non-solvent for cathode configurations may be water-based, which is miscible with n-methyl-2-pyrrolidone while precipitating polyvinylidene fluoride, facilitating the phase inversion process required to create the low-tortuosity channels. For anode configurations, the active material may be graphite-based. The solvent used for anode configurations may be water-based, due to its ability to effectively disperse anode binder, which may be carboxymethyl cellulose. Carboxymethyl cellulose or other appropriate anode binder materials may be selected for their ability to facilitate ion transfer and adhere to the active material. The non-solvent for the anode configuration may be acetone-based, which is miscible with water while not dissolving carboxymethyl cellulose, thereby enabling the phase inversion process necessary to create the low-tortuosity channels.

Figure 5:
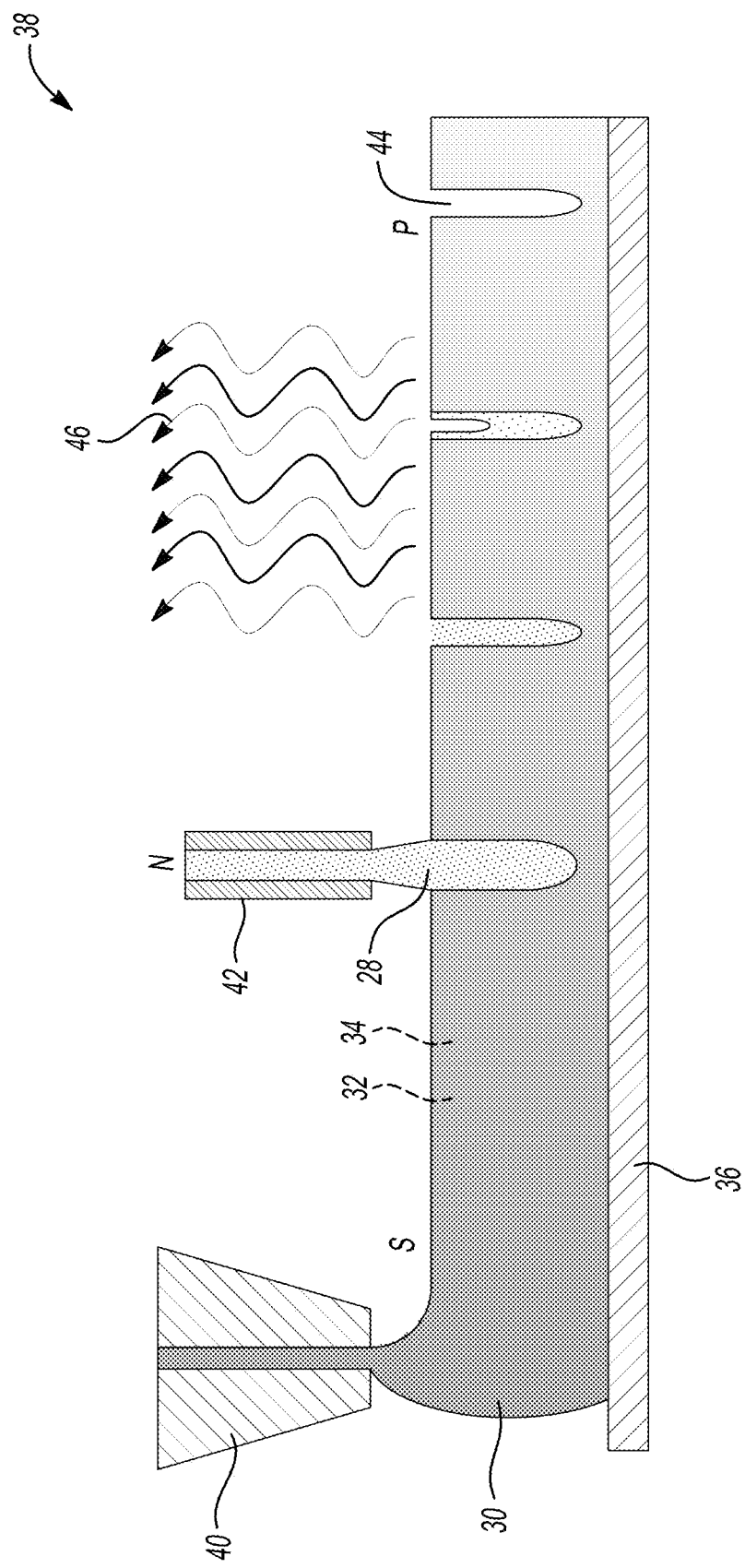
FIG. 5 is a schematic diagram of a manufacturing process according to any one or more aspects of the disclosure.

FIG. 5 shows the injection of a non-solvent 28 into a slurry 30 of a solvent 32 and a polymer binder 34, after the slurry 30 is deposited onto a substrate 36 to form a wet electrode 38. As the wet electrode substrate 36 advances from the deposition die head 40, passing beneath the injection head 42, the column of non-solvent 28 is applied. This non-solvent column displaces the surrounding slurry 30 and induces the precipitation of the binder 34, forming a columnar structure or pit 44 around the injection point. During the drying phase 46, both the solvent 32 and non-solvent 28 are removed through evaporation, leaving the pit 44 intact. During formation of the wet electrode 38 into an electrode assembly, the pit 44 may be filled with suitable electrolyte material, contributing to the low-tortuosity channel network within an electrode by increasing an electrolyte's potential ionic conduction pathways.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "channel" and "channels," for example, can be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method comprising:
    coating a conductive substrate with an electrode slurry of solvent, active material, binder, and additives to form a wet electrode; and
    injecting a column of miscible non-solvent fluid into a surface of the wet electrode to displace the electrode slurry around the column and initiate non-solvent-induced phase inversion of the binder in contact with the miscible non-solvent fluid such that the binder in contact with the miscible non-solvent fluid solidifies around the column into a solid-free channel at the surface of and into the wet electrode.

2. The method of claim 1 wherein the column is injected into the surface of the wet electrode by ink-jet deposition.

3. The method of claim 1 wherein the active material is lithium-based.

4. The method of claim 3 wherein the solvent is N-methyl-2-pyrrolidone.

5. The method of claim 3 wherein the binder is polyvinylidene fluoride.

6. The method of claim 3 wherein the miscible non-solvent fluid is water-based.

7. The method of claim 1 wherein the active material is graphite-based.

8. The method of claim 7 wherein the solvent is water-based.

9. The method of claim 7 wherein the binder is carboxymethyl cellulose.

10. The method of claim 7 wherein the miscible non-solvent fluid is acetone-based.

11. A method of forming a solid-state battery cell comprising:
    injecting a slurry of solid electrolyte and non-solvent into a wet electrode coating including active material and binder to displace the wet electrode coating around the slurry and initiate non-solvent-induced phase inversion of the binder in contact with the slurry such that the binder in contact with the slurry solidifies around the slurry into a pit in the wet electrode coating.

12. The method of claim 11 wherein the slurry is injected into the wet electrode coating by ink-jet deposition.

13. A method comprising:
    mixing active material, solvent, and polymer binder to form an electrode slurry mixture;
    coating the electrode slurry mixture onto a current collector to form a wet electrode; and
    injecting a column of miscible non-solvent fluid into the wet electrode to form a channel at a surface of and into the wet electrode after evaporation of the miscible non-solvent fluid and the solvent.

14. The method of claim 13 wherein the column is injected into the wet electrode by ink-jet deposition.

15. The method of claim 13 wherein the active material is lithium-based.

16. The method of claim 15 wherein the solvent is N-methyl-2-pyrrolidone and the polymer binder is polyvinylidene fluoride.

17. The method of claim 15 wherein the miscible non-solvent fluid is water-based.

18. The method of claim 13 wherein the active material is graphite-based.

19. The method of claim 18 wherein the solvent is water-based and the polymer binder is carboxymethyl cellulose.

20. The method of claim 18 wherein the miscible non-solvent fluid is acetone-based.

* * * * *